United States Patent [19]

Bourne

[11] 3,977,211
[45] Aug. 31, 1976

[54] ALCOHOL SEPARATOR

[75] Inventor: Joseph R. Bourne, Dewitt, N.Y.

[73] Assignee: Carrier Corporation, Syracuse, N.Y.

[22] Filed: Nov. 14, 1975

[21] Appl. No.: 631,983

[52] U.S. Cl. .................................. 62/476; 62/486
[51] Int. Cl.² ........................................ F25B 15/00
[58] Field of Search ............... 62/476, 85, 101, 102, 62/112, 486

[56] References Cited
UNITED STATES PATENTS

| 1,477,127 | 12/1923 | Kasley | 62/85 |
| 1,996,094 | 4/1935 | Backstrom | 62/486 |
| 2,059,877 | 11/1936 | Kogel | 62/486 |
| 2,072,144 | 3/1937 | Ullstrand et al. | 62/486 |
| 2,551,666 | 5/1951 | Gilmore | 62/85 |
| 3,605,873 | 9/1971 | Leonard, Jr. | 62/476 |

Primary Examiner—Lloyd L. King
Attorney, Agent, or Firm—J. Raymond Curtin; Thomas J. Wall

[57] ABSTRACT

An alcohol reclaiming apparatus for use in an absorption refrigeration system having a separator operatively connected to the system condenser for removing alcohol from liquid refrigerant prior to passing the refrigerant from the condenser section to the evaporator section of the system. The separated alcohol is delivered directly into the system absorber, thereby bypassing the evaporator, to promote continuous circulation of alcohol through the system whereby the performance of the system is maintained at a relatively high level.

7 Claims, 2 Drawing Figures

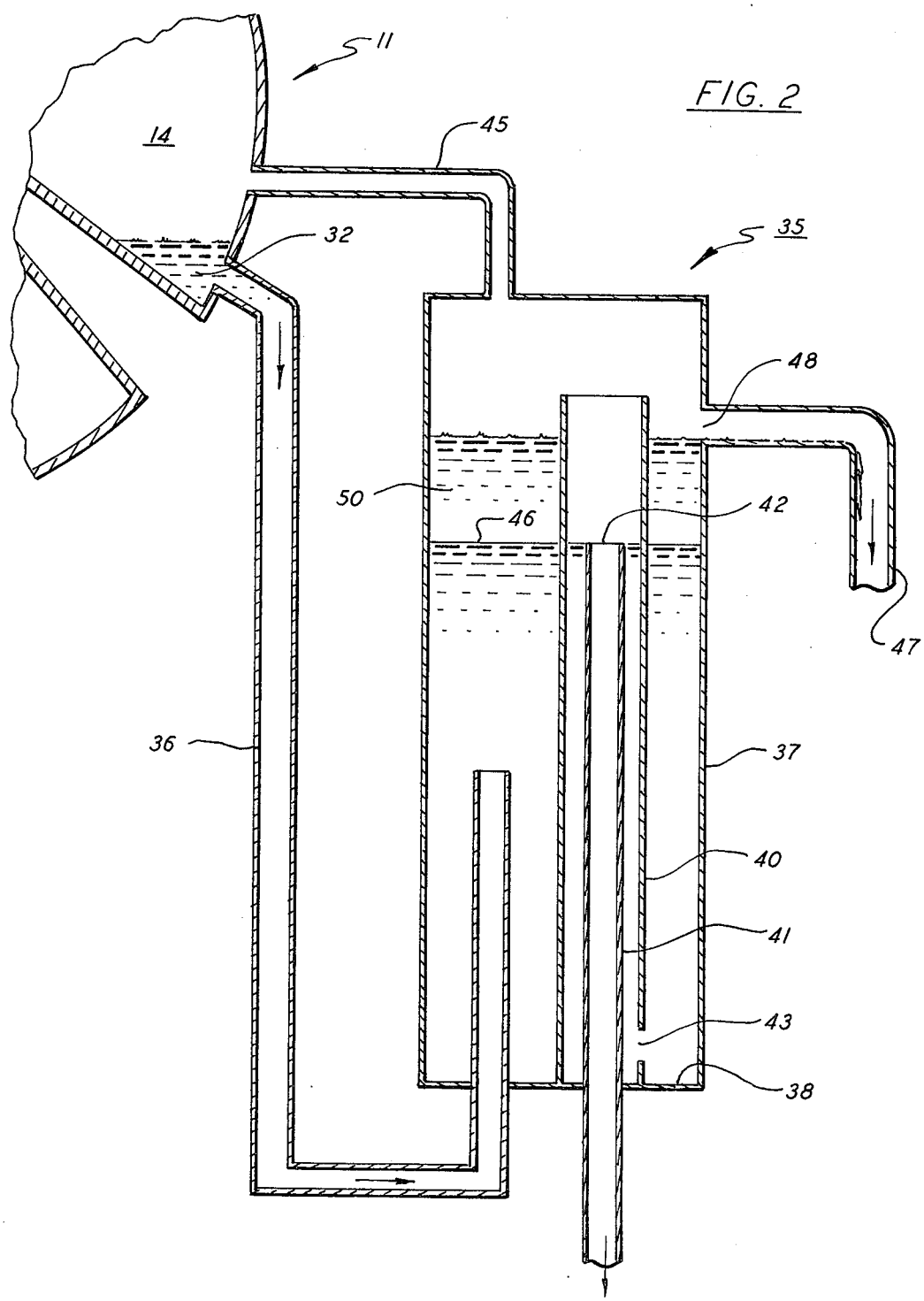

ALCOHOL SEPARATOR

BACKGROUND OF THE INVENTION

This invention relates to an alcohol reclaiming circuit for use in an absorption refrigeration system for maintaining the system at a constant high level of operation.

It has long been recognized in the absorption refrigeration art that the addition of alcohol to the working fluids contained within the system greatly enhances the overall performance of the system. Although the exact mechanism involved is not fully understood, the results obtainable can be dramatically demonstrated in practice. Often times, an increase in performance in excess of thirty percent (30%) can be immediately realized by the introduction of a small amount of alcohol into the system. However, it has heretofore been difficult, if not impossible, to sustain this high level of operation for any appreciable period of time. Experience has shown that the gain in performance that is initially achieved continually diminishes with time until the gain is ultimately reduced to zero. It has heretofore been the common practice to add more alcohol to the system when performance drops below a predetermined level. This procedure, however, is not entirely satisfactory in that it requires continual monitoring of the system's performance, produces an undesirable buildup of alcohol within the system, and results in unwanted variations in overall machine performance.

SUMMARY OF THE INVENTION

It is therefore an object of the present invention to improve absorption refrigeration.

A further object of the present invention is to provide a separator for removing alcohol from liquid refrigerant discharged from the condenser section of an absorption refrigeration system.

Another object of the present invention is to prevent alcohol from passing through the evaporator section of an absorption refrigeration system.

These and other objects of the present invention are attained in an absorption refrigeration system by means of a separator having a tank arranged to receive liquid condensate discharged from the condenser section of the system which is arranged to promote quiescent flow conditions within the tank whereby less dense alcohol is collected upon the surface of more dense refrigerant, a trap contained within the tank for isolating liquid refrigerant from the alcohol, means to maintain the surface of the refrigerant contained within the tank at a predetermined level, means to remove the alcohol collected on the surface of the refrigerant within the tank from the tank, means to deliver the alcohol removed from the tank into the absorber section of the system, and means to deliver refrigerant from the trap into the evaporator section of the system.

BRIEF DESCRIPTION OF THE DRAWINGS

For a better understanding of the present invention, as well as other objects and further features thereof, reference is had to the following detailed description of the invention to be read in connection with the accompanying drawings, wherein:

FIG. 2 is an enlarged partial section illustrating a separator operatively connected to the condenser section of the machine shown in FIG. 1.

DESCRIPTION OF THE PREFERRED EMBODIMENT

Figure 1:
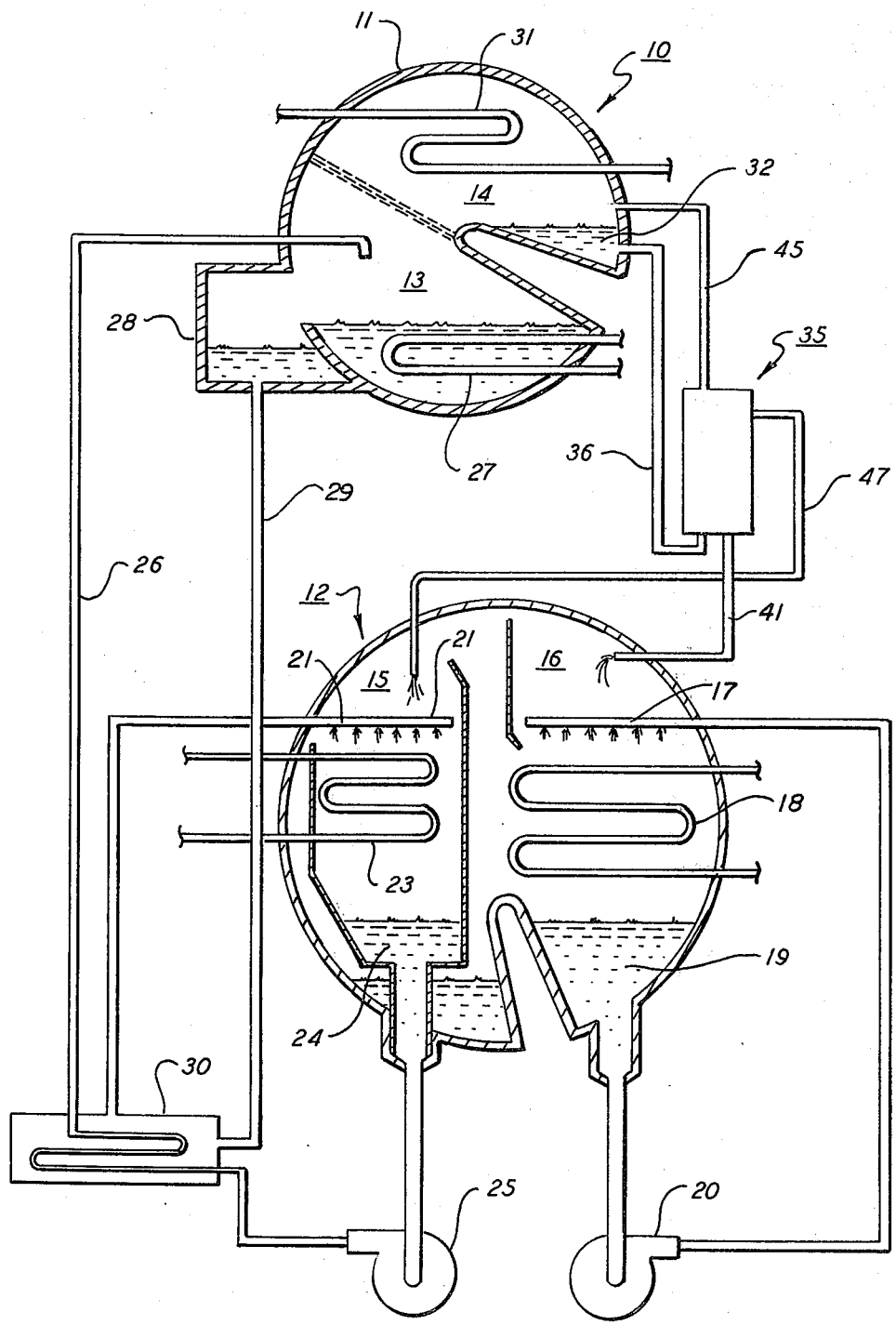
FIG. 1 is a schematic representation of an absorption refrigeration machine utilizing the teachings of the present invention.

The present invention shall be herein described in reference to a conventional absorption refrigeration system utilizing lithium bromide as an absorptive solution and water as the refrigerant. It should be understood, however, that the teachings of the present invention are not necessarily limited to this specific environment and, as will become apparent from the description below, the invention has broader application within the art. A conventional absorption machine 10 utilizing a lithium bromide cycle is illustrated in FIG. 1. Basically, the main machine components include an upper shell 11 and a lower shell 12. The upper shell contains a generator section 13 and a condenser section 14, while the lower shell contains an absorber section 15 and an evaporator section 16.

The lower shell is generally evacuated to about 0.25" of mercury absolute and refrigerant sprayed into the evaporator by means of a header 17 arranged to direct the refrigerant over a tube bundle 18 through which a substance to be chilled is passed. At this low pressure, water (refrigerant) boils at about 40°F and thus is caused to evaporate upon the tube bundle to absorb energy (heat) from the substance passing therethrough. Refrigerant vapors generated as a result of the evaporation process are permitted to pass through a baffle network directly into the absorber section of the lower shell. Liquid refrigerant, which remains behind in the evaporator, is collected in the lower sump 19 from where it is recycled through the refrigerant spray header by means of a refrigeration pump 20.

Water vapors entering the absorber are exposed to a strong or concentrated solution of lithium bromide which is discharged from a second solution spray header 21. As a result, the vapors are absorbed by the lithium bromide and rapidly reduced to a condensate. The heat of condensation generated during the absorption process is carried out of the system by means of a coolant, such as water, passing through heat exchanger 23 over which the absorptive solution is sprayed. Diluted solution passes to the bottom of the absorber and is collected in reservoir 24.

The primary function of the sections located in the upper shell is to sustain the absorption process. In operation, dilute solution is pumped, via solution pump 25 and line 26, through heat exchanger 30 into the generator section of the upper shell where the weak solution is heated by steam loop 27 or any other suitable heating means. The upper shell is maintained at a relatively low pressure, generally about 3" of mercury absolute, whereby the refrigerant contained in the weakened solution is readily boiled or driven out of the solution at these relatively low pressures, thus reconcentrating the solution. Reconcentrated solution is collected within chamber 28 and gravity fed therefrom by means of supply line 29. The supply line passes the solution into the shell side of heat exchanger 30 from where it is delivered into the solution spray header 21 for reuse in the absorption process. In the exchanger 30, the strong solution gives up some of its energy to the weak solution as the weak solution is pumped from the absorber section into the generator section thereby improving the efficiency of the cycle.

The refrigerant vapors driven from the lithium bromide solution within the generator are permitted to pass directly into the condenser section where the vapors pass over a condenser coil 31. Cooling water is passed through the condenser coil which serves to reduce the vapors to a liquid condensate. The heat of condensation is carried out of the system by the cooling water and eventually discharged into a heat sump (not shown). The condensate formed in the condenser is collected within the condenser sump 32 from where it is eventually delivered back into the evaporator section.

As conventionally practiced in the art, alcohol is added to the working fluids contained within the system and allowed to follow the normal flow path of fluids in an uncontrolled manner. It is believed that the effectiveness of the alcohol process is enhanced when the alcohol is vaporized within the absorber section. When in a vaporized state, alcohol has the ability to thoroughly coat or blanket the heat exchanger tubes and, as noted in practice, greatly enhances the transfer of energy between the substances involved. As can be seen, the chilling operation within the system takes place in the evaporator section. As such, this section represents the lowest temperature region within the system. As a consequence, the amount of alcohol vaporization within the evaporator is minimized and thus the effectiveness of the additive in this section is minimal when compared to that achieved in other sections, particularly the absorber section.

A further, and probably more serious, occurrence takes place when alcohol passes through the evaporator section. Because of the lower temperatures involved, a portion of the alcohol in this section is liquefied along with the refrigerant and deposited within the evaporator sump. The liquid alcohol, being less dense than the refrigerant, rises to the surface of the refrigerant pool maintained in the sump and thus tends to stagnate. Accordingly, less alcohol becomes available in other sections. As the amount of stagnant alcohol increases, the system's performance falls off proportionally until ultimately the gain is reduced to zero. Although more alcohol can be added to the system to bring the performance back to a higher level, the stagnation process continues. This results in an unwanted buildup of alcohol within the evaporator.

In the present apparatus, a separator unit 35 is operatively connected to the condensate discharge line 36 of the system condenser which functions to divert the flow of alcohol around the evaporator section. As best illustrated in FIG. 2, the separator includes a holding tank 37 of any suitable cross-sectional configuration that is arranged to receive a continuous flow of condensate discharged from the condensate discharge line. The internal volume of the tank is sized so that the tank appears as a sudden enlargement to the entering fluids. In accordance with the relationship governing the flow of fluids into an enlarged area, the volume rate of flow of the entering condensate is rapidly dissipated within the tank to produce relatively quiet flow conditions. To further promote quiescence within the tank, the discharge end of line 36 is brought through the bottom wall 38 of the tank and raised to an elevation whereby the condensate is expelled into the main body of liquid contained within the tank.

A vertically aligned refrigerant trap 40 is secured in fluid-tight relation, as for instance by welding, to the bottom wall of the tank. The refrigerant trap extends upwardly within the tank to a predetermined elevation. Passing upwardly within the trap is a smaller refrigerant discharge line 41 that terminates with an opening 42 positioned below the top surface of trap 40. The refrigerant discharge line passes through the bottom wall of the tank and, as best seen in FIG. 1, empties directly into the evaporator section of the refrigeration system.

A port 43 is provided in the side wall of the trap adjacent to the bottom wall of the holding tank. The denser liquid refrigerant, which collect in the bottom of the tank, are allowed to pass freely from the main body of the tank into the trap via the port. In operation, the separator is located below the condenser sump to permit the mixture of liquid refrigerant and alcohol to be gravity fed into the tank from the condenser. Because of the quiescent flow conditions maintained within the tank, the less dense alcohol rises to the surface of the more dense refrigerant. As fluids are collected in the separator, the surface level of the refrigerant, and consequently that of the alcohol floating thereon, rises toward the top of the tank. As noted, the heavier refrigerant at the bottom of the tank are allowed to pass directly into the trap whereby the trap also fills with refrigerant. The top surface of the trap is provided with an opening 44 to equalize the tank pressure and trap pressure. As a result, the level of refrigerant contained within the trap is maintained at the same level as that contained within the tank. When the refrigerant in the trap reaches the elevation of the opening 42 formed in the refrigerant discharge line, any addition of refrigerant into the tank will cause refrigerant to flow out of the discharge line and be gravity fed directly into the evaporator section. As can be seen, when the absorption system is in operation, a continuous flow of refrigerant will be moving through the separator, however, the refrigerant contained therein will be at a constant level 46 (FIG. 2). To insure that the pressure in the separator does not fluctuate, a pressure equalizing line 45 is arranged to pass between the top surface of the holding tank and the condenser section.

An alcohol discharge line 47 passes through the side wall of the tank. The line has an opening 48 therein which is located at an elevation slightly higher than the constant refrigerant level 46 maintained in the tank, but below that of the pressure equalizing opening situated in the top of the trap. A layer of alcohol 50 is thus collected upon the surface of the refrigerant contained within the tank, however, because of the operation of the separator, the alcohol layer is isolated from the refrigerant contained in the trap. As more alcohol is collected in the tank, the alcohol is caused to flow out of the opening 48 and be delivered via line 47 directly into the absorber section.

It should be noted that the alcohol delivered from the separator into the absorber is at a higher pressure than the absorber pressure. Upon entering the low pressure section, the alcohol is expanded to a vapor which, as noted, enhances its ability to coat the absorber exchanger tubes and thus raise absorber effectiveness. The alcohol discharge is positioned directly above the solution spray header and is arranged to direct the additive into the stream of relatively high temperature solution issuing therefrom to promote a distributed flow of alcohol over the exchanger tube bundle. The solution being at an elevated temperature also serves to promote and maintain the alcohol in a vaporized state.

It should be clear from the discussion above that the instant separator functions to alter the flow path of the alcohol through the system. In effect, an independent path of travel is established for the alcohol which by-passes the evaporator section By directing the alcohol around the evaporator, stagnation of this additive is considerably reduced without appreciably effecting the system's performance. By the same token, the new flow path also promotes continuous circulation of the alcohol through the absorber in a vaporized state thereby enhancing the effectiveness of this critical section. As a result, the system is maintained at a constant high level of operation and the need for frequent addition of alcohol to the system eliminated.

While this invention has been described with reference to the structure herein disclosed, it is not confined to the details as set forth, and this application is intended to cover any modifications or changes as may come within the scope of the following claims.

What is claimed is:

1. Apparatus for separating alcohol from a denser refrigerant discharged from the condenser section of an absorption refrigeration system including
   a tank operatively connected to the condenser section of the system to receive therein a flow of condensed refrigerant and alcohol leaving the condenser, the volume of the tank being sufficiently large in relation to volume rate of flow of the entering condensate to produce a quiescent flow of fluids within the tank whereby the less dense alcohol floats to the surface of the more dense refrigerant collected therein,
   a substantially enclosed trap secured in fluidtight relation with the bottom wall of said tank and extending upwardly within said tank in a generally vertical direction, the trap having an opening in one side wall thereof adjacent to the bottom wall of said tank whereby refrigerant contained within the tank passes freely into said trap,
   a refrigerant discharge passing out of said trap at a first elevation and being arranged to pass refrigerant out of said tank when the level of refrigerant exceeds said first elevation whereby the level of refrigerant in the trap and the tank is maintained at a constant level, and
   an alcohol discharge passing out of said tank at a second elevation that is higher than said first elevation and being arranged to carry alcohol floating upon the surface of the refrigerant out of said tank when the level of alcohol exceeds said second elevation thereby causing the alcohol to be separated from the refrigerant.

2. The apparatus of claim 1 having further means for maintaining said tank and said trap at substantially the same pressure whereby the surface of the refrigerant within the trap is equal to that of the refrigerant in said tank.

3. The apparatus of claim 2 further including means for maintaining the pressure in said tank and trap at a constant level.

4. The apparatus of claim 3 wherein said means for maintaining a constant pressure level in the tank and the trap comprises a line extending between the top of the tank and the condenser section whereby the tank and the trap are maintained at condenser pressure.

5. The apparatus of claim 1 wherein the fluid condensate discharged from the condenser enter the tank at an elevation higher than the opening in the side wall of said trap and below the elevation of the refrigerant discharge.

6. The apparatus of claim 1 wherein said refrigerant discharge comprises a line passing through the bottom wall of said tank and extending upwardly within said trap, said line being terminated by an opening positioned at said first elevation.

7. The apparatus of claim 1 wherein the refrigerant passing out of said refrigerant discharge is delivered into the evaporator section of the refrigeration system, and the alcohol passing out of said alcohol discharge is delivered into the absorber section of the refrigeration system.

* * * * *